United States Patent [19]
Fedak

[11] Patent Number: 5,820,266
[45] Date of Patent: Oct. 13, 1998

[54] TRAVELLING THERMOCOUPLE METHOD & APPARATUS

[76] Inventor: Tibor J. Fedak, 1335 E. Steamboat Bend Dr., Tempe, Ariz. 85283

[21] Appl. No.: 762,764

[22] Filed: Dec. 10, 1996

[51] Int. Cl.[6] .................................................. G01K 7/04
[52] U.S. Cl. .......................... 374/179; 432/45; 432/239
[58] Field of Search .................................... 374/110, 116, 374/141, 149, 179, 208; 136/230; 414/150, 152, 157, 172; 219/210, 388, 494; 432/34, 45, 239, 241

[56] References Cited

U.S. PATENT DOCUMENTS

| | | |
|---|---|---|
| 3,931,847 | 1/1976 | Terkelsen . |
| 4,292,054 | 9/1981 | Noack . |
| 4,338,078 | 7/1982 | Lampkin . |
| 4,360,277 | 11/1982 | Daniel . |
| 4,419,023 | 12/1983 | Hager . |
| 4,488,014 | 12/1984 | Daniel . |
| 4,515,484 | 5/1985 | Gilley . |
| 4,558,959 | 12/1985 | Thomas . |
| 4,602,904 | 7/1986 | Jeffreys . |
| 4,609,343 | 9/1986 | Tejfalussy .................................. 432/45 |
| 4,695,706 | 9/1987 | Mizushina ................................ 414/172 |
| 4,787,551 | 11/1988 | Hoyt . |
| 4,820,907 | 4/1989 | Terauchi . |
| 5,473,978 | 12/1995 | Colombo .................................. 414/150 |
| 5,567,909 | 10/1996 | Sugarman et al. ........................ 374/179 |

*Primary Examiner*—G. Bradley Bennett
*Attorney, Agent, or Firm*—Donald J. Lisa

[57] ABSTRACT

A travelling thermocouple dynamically profiles the actual temperature of a substrate passing through a vertical oven without entangling the thermocouple wires. Media components, such as microprocessor chips in a semiconductor wafer, are supported on a tray or plate on a driven conveyor. A thermocouple formed of two metal wires of extended length are connected at one end to the media component and at the other end to a stationary readout device and function as the temperature gauge for all trays of components passing through the oven. A C-shaped clamp or hook secured to the thermocouple wires resiliently engages a chain drive driven independently of the conveyor drive but in correlation therewith by a computer controller and pulls the wires through the oven keeping pace with the media component to which it is attached. When turning the corners at the top of the oven the hook is crossed over from the leading end of the plate to the trailing end of the plate by effecting temporary relative motion between the drives. The wires are guided in a G-shaped channel throughout their passage in the oven. After exiting the oven, the hook is disconnected from the chain, and the wires are pulled forwardly through the oven after being disconnected from the readout device for reuse in another pass. An alternate embodiment is in a horizontal oven which includes going around corners.

22 Claims, 7 Drawing Sheets

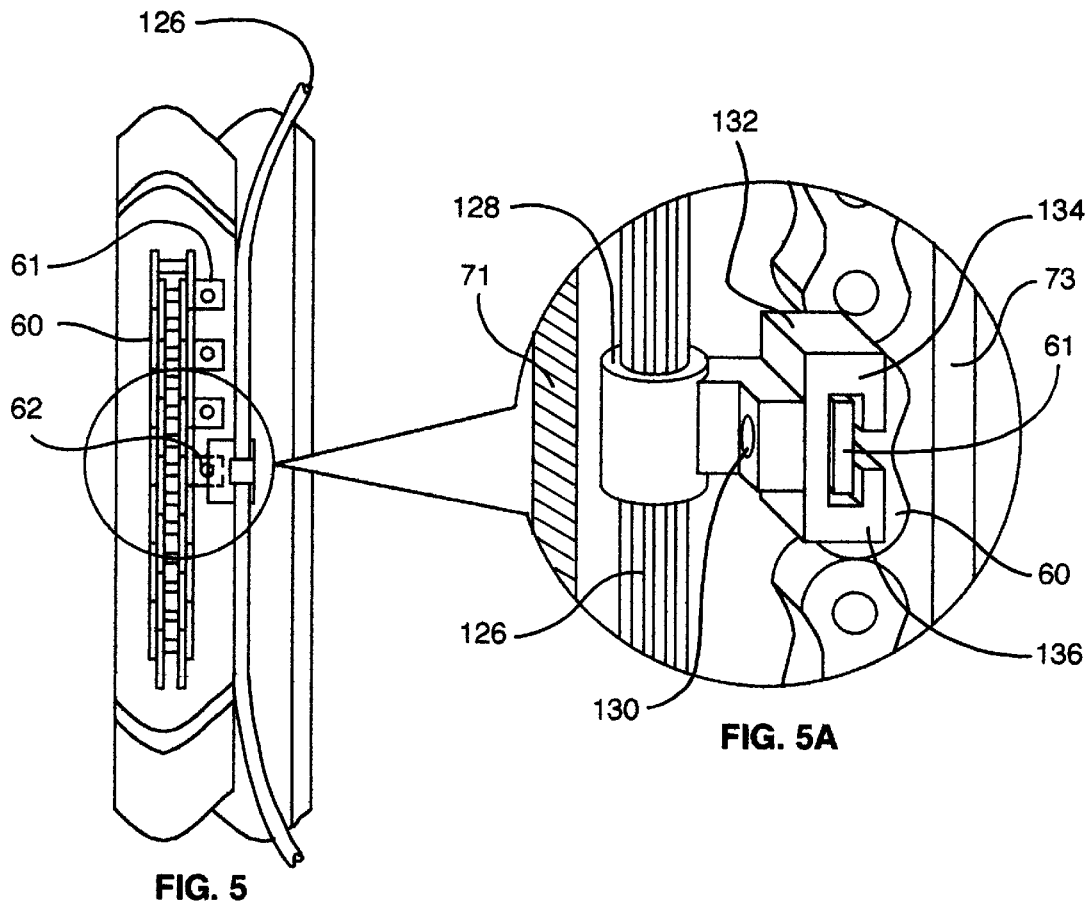
FIG. 5
FIG. 5A
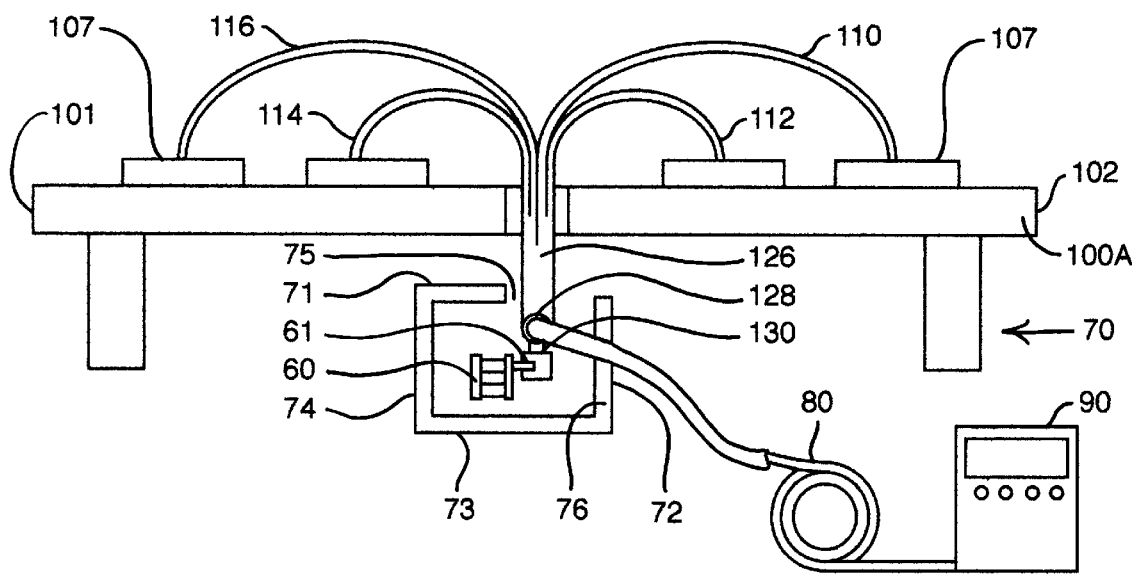
FIG. 5B

TRAVELLING THERMOCOUPLE METHOD & APPARATUS

BACKGROUND OF THE INVENTION

1. Fields of the Invention

The present invention relates generally to a method and apparatus for obtaining a dynamic profile of the actual temperature of a product, for example, a substrate, such as, a semiconductor wafer and the like, as it traverses an oven which performs heat treatment of the product, and, more particularly to measuring temperature of the product during its passage through a vertical oven using a thermocouple formed of two metal wires of extended length attached to the product at one end without entangling the metal wires as they are pulled through the oven with the product.

2. Discussion of Background and Prior Art a. Profile Data

As is well known in the art, a conventional heat treatment apparatus for thermally treating a substrate, such as, a semiconductor wafer, by a heating means, such as, an oven, requires control data for maintaining predetermined times in the curing process. In other words, each substrate to be heat treated comes with so-called "profile data" which defines the curing parameters for the substrate. Such profiles are normally stored in a computer memory which controls the heat treatment apparatus and is pre-programmed according to the substrate being cured. A temperature measuring device, such as, a thermocouple or other temperature sensing means is generally employed both to initially create the profile for each substrate to be produced and to also provide feedback on a dynamic basis for the oven actually doing the curing of the product to assure that the oven is maintaining a temperature consistent with the required profile for the substrate being cured. This data is typically provided by a thermocouple attached to one or more of the identical products (i.e., a test tray of products) being cured sitting on a tray passing through the oven along with many other standard production trays carrying many other production versions of the same products not attached to a thermocouple. Thus, one thermocouple on one tray serves as the indicator or proxy of the temperature of the other production products. Once the correct recipe is established, the correctness of the curing process need only be confirmed thereafter periodically, i.e., weekly thereby saving needless expense.

b. Oven Types

In heat treating objects generally, and substrates particularly, three types of ovens are typically used.

First, is a batch type oven which is similar to a standard stationary microwave oven. A substrate is inserted into the oven, the oven is heated up to a temperature for a predetermined time, and then allowed to cool, and the heat treated objects are removed.

A second oven type is a horizontal oven which generally employs a driven conveyor to transport the object being heat treated through the oven of some extended horizontal length. However, horizontal ovens have a large footprint. For example, a 150 square feet footprint for heat treating semiconductor substrates is common for such ovens.

A third type oven is a vertical oven which transports the objects to be heat treated on a tray on a driven conveyor belt. In a typical vertical oven, the trays enter the oven horizontally, then the trays are raised vertically up one side of the oven then moved horizontally across a top portion of the oven and then lowered vertically down the other side of the oven from which the trays then exit horizontally. A vertical oven has major advantages over batch and horizontal ovens in that they are more easily automated, the throughput is increased, and the footprint is substantially reduced. For example, it is common for such ovens to have a 15 square feet footprint for a vertical oven which heat treats semiconductor substrates. However, as pointed out more fully below, vertical ovens introduce the unique problem of entanglement of the wires of a travelling thermocouple used to gauge the profile.

In order to assure consistency in the heat treatment of the product during its passage through the oven, preferably the actual product temperature is monitored by a temperature sensing device.

In a batch type oven typically a probe of a thermocouple is inserted into the oven at or near the product. A thermocouple of this type works fine in a batch oven because there is no travelling motion of the thermocouple to accommodate.

In a straight (no bends) horizontal type oven a thermocouple formed of two metal wires of extended length typically is directly attached to the product and its support structure to make the temperature profile as the product goes through the oven and the support structure pulls the wires in trail as it passes through the oven. One such apparatus to Daniel U.S. Pat. No. 4,360,277 ("Daniel") discloses a portable fabric temperature profiler which enables the obtaining of a temperature profile (FIG. 8) of a moving substrate, particularly, a fabric web moving through a straight horizontal drying or heat setting oven (FIG. 7). Daniel discloses a substrate having sharpened pins supported on a fabric web, the pins penetrating and engaging the web to hold the temperature sensing probe of the thermocouple on the support during its traverse through the oven. The metal wires of extended length are connected and wound on a reel which is held by the operator and the reel lets out the wire during the probe's traverse through the oven while providing electrical continuity between the wire and a stationary recorder. After completing a pass through the oven, the probe is removed from the web, the wire is wound up on the reel, and the probe is carried back to the oven entrance to repeat the procedure as necessary. The problem with this type of travelling thermocouple is that it is limited to straight horizontal ovens without horizontal turns and in any case allows for the wires to be entangled especially when multiple probes on multiple substrates on multiple carriers are employed. Accordingly, it is an object of the present invention to provide a travelling thermocouple which eliminates entanglement of the wires in any type of oven even when multiple probes on multiple substrates on multiple carriers are simultaneously employed or where turns are mandated.

c. Prior Art Measurement Problems (1) Fixed Probes

It is known to measure the actual temperature in an oven which is treating a product by placing plural fixed probes in the oven along the route each of which is separately connected to a readout device which reads the temperature at that location. One problem with such a measurement method is to determine where to put the probe and how to correlate the readouts with the prescribed profile required for curing the object.

In measuring the temperature at which objects are heat treated in an oven, a major problem is how to actually measure the temperature of the product itself in the oven as distinguished from measuring the temperature of an area in the oven close to the product. For products such as microprocessor chips, a temperature spread of 4° C., or +/−2° C. is critical for a product such as a microprocessor. Thus, there is a long felt need to measure the product itself to assure that the curing process remains within the tolerance prescribed by the pre-set profile. A good analogy is that while the temperature of a microwave oven is selected by setting a knob to a selected temperature, a good cook still uses a pop-up thermo-gauge stuck into the breast of a turkey to know when it is really done.

It is known to measure the actual temperature of a product on a moving conveyor belt traversing an oven by contacting the product itself with a thermocouple assembly. In a system to Thomas in U.S. Pat. No 4,558,959 there is disclosed a thermocouple which measures temperature of a flat strip moving horizontally through a furnace. The thermocouple is fixed and extends vertically into the oven through an aperture in a fixed guide assembly and can reach down into the oven to contact the moving strip for taking measurements. However, one of many problems with this apparatus and process is that it does not provide for a continuous readout of the product temperature throughout its traverse of the oven. Accordingly, it is an object of the present invention to continuously measure the actual temperature of the product itself during its traverse throughout the curing process in the oven.

(2). Infrequent Measurements

Another problem derives from the infrequency with which temperature measurements are made. As described earlier, it is inefficient to make frequent measurements to determine that the oven is maintaining a temperature consistent with the profile of the product being cured, especially when the assembly line is set up to run a certain product over a long time duration. Temperature sensing, in such instances, is normally done once a week to assure that the recipe is correct. However, infrequent measurements aggravates the problem of correlating the resultant measurements to the product being run if those measurements are, when taken, not taken at every point along the path so that any heating problem wherever it appears in the passage may be readily detected. Accordingly, it is an object of the present invention to provide a continuous temperature sensing method that improves the correlation between the frequency with which measurements are made and the profile of the product being run.

(3) Travelling Thermocouple and Entanglement of the Thermocouple Wires

The major problem with using a thermocouple formed by two wires of extended length especially in connection with a vertical oven having vertical turns, or even in connection with a horizontal oven having horizontal turns, is the entanglement of the wires forming the thermocouple. This entanglement problem is aggravated when multiple thermocouples are attached to multiple substrates on multiple trays or carriers thereof.

One solution to the problem of a travelling thermocouple connected to a stationary readout is to put the readout device onto the belt carrying the substrate and have it move with the substrate. One such device is shown in Gilley U.S. Pat. No. 4,515,484 which attaches a digital readout 26 via thermocouple wire 24 to the upper surface of substrate 16 moving on belt 12 over heater platens 10. Another such device is disclosed in Jeffreys U.S. Pat. No. 4,602,904 as a circular oven 10 for heating railway wheels in which display device 64 is connected via thermocouple wire 62 to wheel 26 held on support 30 resting on moveable hearth 46. The problems with these solutions are that they are not travelling thermocouples attached to a stationary readout external of the heating chamber, the heating chamber must accommodate the travelling readout device, and the travelling readout device must withstand the heat treatment in the heating chamber. Accordingly, it is an object of the present invention to eliminate the travelling thermocouple entanglement problem without eliminating the travelling thermocouple attached to a stationary readout device external of the heating chamber.

In a system to Terauchi U.S. Pat. No. 4,820,907 ("Terauchi") the inventor eliminated one aspect of the problem wherein entanglement occurred during the making of the profile data itself from a stationary substrate to which the extended thermocouple wires was connected. Terauchi prevented entanglement of the wires by connecting one end of the thermocouple wires 15 to a stationary substrate 10 and to a stationary terminal mount 19 and the other ends of the extended thermocouple wires 31 to a fixed terminal driving mechanism 21 having movable terminals 20 therebetween whereby the moveable terminals could be driven into contact with the fixed terminals 19 to readout the temperature from the thermocouple without risk of entangling the extended lengths of the thermocouple wires 31 which were drawn out from the oven and connected to a measurement readout device. The problem with this solution is that it avoids entanglement during the profile data taking operation, but cannot be utilized in connection with a travelling thermocouple connected to a substrate travelling through an oven.

Thus, in a vertical oven as pointed out above, a thermocouple formed of two metal wires of extended length cannot be used without serious risk of entangling the wires with the hardware or other throughput products, especially when multiple substrates are being cured on multiple trays carried by the driven conveyor. Accordingly, there is a long felt need and it is an object of the present invention to provide a travelling thermocouple formed of two metal wires of extended length for use in vertical ovens or horizontal ovens which have curved passages therethrough requiring the product to go around a corner.

Additionally, in the past, temperature was typically sensed in a vertical oven by a very inefficient process which included the steps of inserting the tray with the thermocouple wire attached to a substrate and dangling therefrom; as the tray with the thermocouple reached the top of the oven, the door would be opened and that tray removed and the door again closed in order to eliminate the possibility of entanglement of the thermocouple wires during what would otherwise have been the traverse across the top of the oven; that tray was then manually carried over to the far side of the oven and the door was again opened and that tray again inserted into the oven, the door again closed, followed by a period of waiting allowing the oven temperature to stabilize; that tray then moved downwardly in the oven and sensing of the temperature recommenced. The problems with this process are that the equilibrium temperature of the oven prescribed for the curing of the substrates was interrupted by the opening and closing of the doors solely for the purpose of removing the thermocouple tray to prevent entanglement of the wires during what would have been the traverse across the top of the oven. The interruption of equilibrium temperature has a negative impact on product quality and throughput. Accordingly, it is an object of the present invention to provide a travelling thermocouple that remains active and in operation throughout the traverse of the thermocouple through a vertical oven or a horizontal oven with corners without interruption of the equilibrium temperature of the oven.

SUMMARY OF THE INVENTION

Set forth below is a brief summary of the invention in order to achieve the forgoing and other benefits and advantages in accordance with the purposes of the present invention as embodied and broadly described herein.

One aspect of the invention is a process of continuously sensing temperature of a media component traversing an oven including the steps of (a) supporting the media component on a tray on a moving conveyor and transporting the tray in a path through the oven, (b) attaching a thermocouple, formed of two metal wires of extended length, at one end to the media component and coupling the thermocouple at the other end to a readout device and continuously sensing the temperature of the media component during the media component's traverse of the oven while pulling a length of the wire through the oven in trail, (c) attaching the wires of the thermocouple to a chain moving independently of the moving conveyor but in synchronism therewith in a traverse of the oven, and (d) temporarily moving the tray relative to the chain to cross the point of attachment of the wires to the chain from a leading end of the tray to a trailing end of the tray, whereby the tray moves around a corner in the path without entangling the extended length of wires.

Further features of this aspect of the invention include the steps of retaining the length of wire in a guide channel throughout its traverse of the oven, attaching the wires to the chain by engaging a wire holder portion, such as a C-clamp, upon a chain extension portion, such as a tab secured to the chain, and resiliently retaining the holder engaged with the chain throughout its traverse of the oven. The resilient retention during the crossover is provided by a spring attached at one end to the holder and the other end to the tray, with the wires having a slack portion extending between the holder and the media component while passing through the tray to the media component, and then moving the slack portion of the wires and the one end of the spring under the tray from a leading end of the tray to a trailing end of the tray.

A further feature of this aspect of the invention includes the temporarily moving step comprising moving the tray forwardly in the oven relative to the chain or moving the chain rearwardly in the oven relative to the tray, such as, stopping the chain while continuing to forwardly move the conveyor carrying the tray.

Further features of this aspect of the invention include moving the tray around a corner in a vertical oven, and moving the tray around a corner in a horizontal oven.

Another aspect of the invention includes the process of sensing the temperature of a product being moved through an oven on a conveyor drive with a thermocouple formed of two metal wires of extended length attached to the product comprising the steps of engaging the wires of the thermocouple with a chain of a chain drive to pull the thermocouple wires in a path completely through the oven, and while generally keeping the chain in pace with the product and while resiliently retaining the engagement of the thermocouple wires to the chain, temporarily moving the conveyor drive relative to the chain drive to enable the product and thermocouple to traverse a corner in the path through the oven without entangling the wires.

Another aspect of the invention includes an apparatus for heat treating a substrate having a main heating chamber with an entrance and exit, and a conveyor drive for transporting a plurality of media components supported on trays on the conveyor drive along a path through the main heating chamber, wherein the improvement comprises a chain drive independent of the conveyor drive for keeping pace with the conveyor drive, a computer controller for synchronizing the heating and drives, a thermocouple, formed of two metal wires of extended length, attached at one end to a media component supported on one of the conveyor drives and at the other end to a readout device for continuously sensing the temperature of the media component during the media component's traverse of the main heating chamber while pulling a length of the wires through the oven in trail, an attachment device secured to the wires of the thermocouple resiliently engaged with the chain drive for pulling the length of the wires through the main heating chamber in synchronism with the media component during the media component's traverse of the main heating chamber, and the computer control enabling a first temporary relative motion between the conveyor drive and chain drive to cross the attachment device from a leading end of the tray to a trailing end of the tray, whereby as the tray moves through the main heating chamber it is enabled to move around a corner in the path without entangling the extended length of wires.

A further feature of this aspect of the invention is a channel extending along the entire path for maintaining the extended length of the wires therein while guiding the extended length of the wires as they are being pulled through the main heating chamber without entanglement wherein, the channel being a G-shaped guide with the open slot on its upper side, the leading end of the wires exiting the slot and passing through a hole in the support to attach to the substrate.

Further features of this aspect of the invention include a spring resiliently holding the attachment device in engagement with the chain of the chain drive as the attachment device is moved relative to the tray from a position near the leading edge of the tray to a position near the trailing edge of the tray, a display coupled to the other end of the thermocouple for reading out the temperatures sensed by the thermocouple, and the attachment device being made easily disengageable from the chain of the chain drive by a second temporary relative motion between the chain drive and the conveyor drive in a direction opposite the first temporary relative motion.

The advantages of this system are that a dynamic profile of the actual temperature of the substrate is achieved throughout its traverse of the oven. Once the wires are hooked, they are pulled through the oven automatically without interruption through the whole cycle. A dynamic record of the component temperature of 8 or more substrates can be obtained at one time. The requirement to open and then close the oven doors to accommodate the thermocouple during profiling is eliminated. The basic capability to perform uninterrupted dynamic profiling is enabled. Entanglement of the thermocouple wires during traverse of the oven is eliminated.

BRIEF DESCRIPTION OF THE DRAWINGS

FIG. 5 is a plan view in partial section of the independent chain drive with tabs and the C-clamp connecting the wire bundle of the travelling thermocouple thereto in one embodiment of the present invention.

FIG. 5A is an enlarged right side view in partial section of the portion of FIG. 5 where the C-clamp connects to the tab of the independent chain drive of the present invention.

FIG. 5B is an enlarged schematic front end view taken along the lines AA of FIG. 2 showing additional components including the test tray assembly, wire bundle G-shaped guide channel, chain drive and C-clamp and also showing the relationship of the wire bundle to the other components of the present invention.

DETAILED DESCRIPTION OF THE PREFERRED EMBODIMENT

Overview

Figure 7:
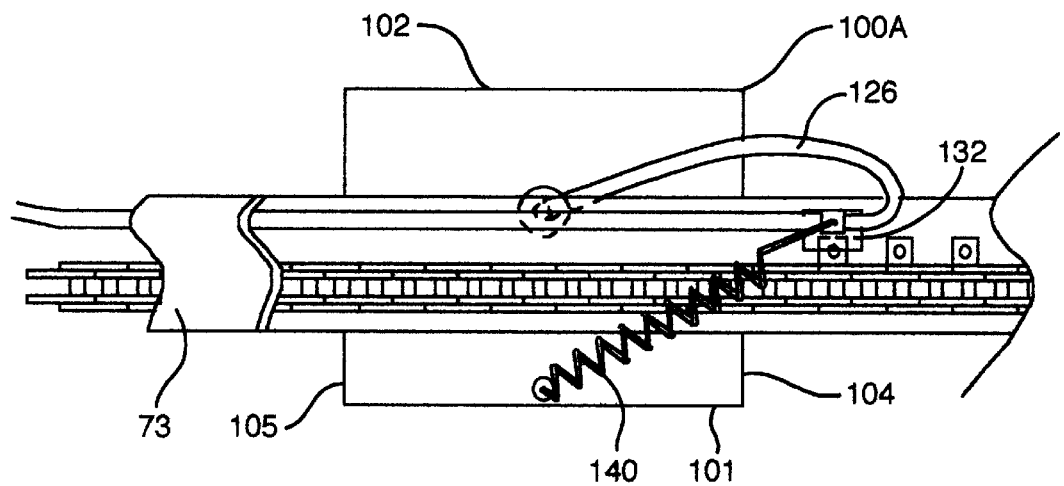
FIG. 7 is a schematic view of the underside of FIG. 6 with the tray in the position of station 2 of FIG. 2 and FIG. 3 as viewed from a position beneath the tray and facing the oven.

In general the present invention includes placing a plurality of semiconductor substrates 107 on a tray 100A on a horizontal driven conveyor 50 with one or more pairs of thermocouple wires 110, 112, 114, 116, 118, 120, 122, and 124 attached to substrates 107. A C-clamp or hook 132 fixed to the bundle of wires 126 engages an independently driven chain drive 60, with the tray 100A, thermocouple with wires 110 etc., and chain drive 60 all moving together. As the chain 60 and tray 110A move into the oven 10, they pull the bundle of thermocouple wires 126 therewith, the other ends of which are attached to a stationary reel 80 and digital readout device 90. At a certain point in the oven 10 the trays 100A rise vertically (stations 2, 3, FIG. 2) with the hook 132 and wires 126 moving therewith (FIG. 3), the wires riding in a vertical portion of a guide channel 70 (FIGS. 3, 7). At the top of the vertical portion 16 of the oven 10, the tray 100A, thermocouples 110, 112, 114, 116, 118, 120, 122, and 124 wires 126, hook 132, and chain 60 are then moved in a horizontal direction (stations 3, 4, 5, 6, and 7; FIGS. 2, 8, 9, and 10) across the top portion 18 of the oven 10 and, as they do, the thermocouple wires are crossed-over from the forward (leading) side of the tray (FIG. 8) to the center (FIG. 9) and finally to the rearward (trailing) side of the tray (FIG. 10) without being disengaged from the substrate 107 and without the C-clamp 132 being disengaged from the tab 61 of chain 60. After that cross-over maneuver, the tray 100A begins to move downwardly in the vertical portion 20 of the oven 10 with the trailing wires 126 staying in a vertical guide channel 70 (identical to riser channel 70 in FIG. 3) and being pulled forwardly to move with the substrate 107. At the bottom of the oven, the tray 100A is again driven horizontally to the right to positions (stations 9, 10, FIG. 2) where it exits the oven. At this point, the operator unhooks C-clamp 132 and the wires 126 from the tab 61 of chain drive 60, the terminal ends of the wires are disconnected from the readout/recorder 90, and the wire bundle 126 is pulled through the oven forwardly, preferably without disconnecting their forward ends from the substrates 107, although in an alternative mode, such disconnection may readily be accommodated. The thermocouple wire bundle 126 and test tray 100A will be reused in another run later. The chain drive 60 is independent of the conveyor moving mechanism 50, but is correlated with it through microprocessor control, such as by computer 11 according to a user entered program at keyboard 12.

Figure 8:
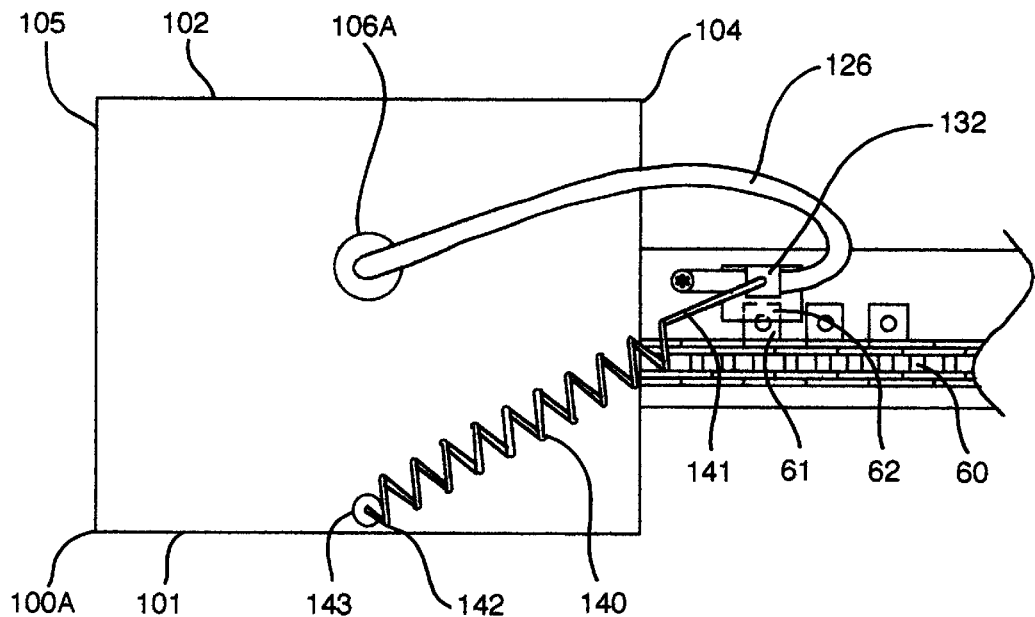
FIG. 8 is a view similar to FIG. 7, but at the top of oven 10 in station 3, of FIG. 2 and showing the spring in tension as the wires of the thermocouple are being pulled vertically through the oven apparatus and further showing the C-clamp position just prior to beginning the crossover maneuver at the top of the oven.
Figure 9:
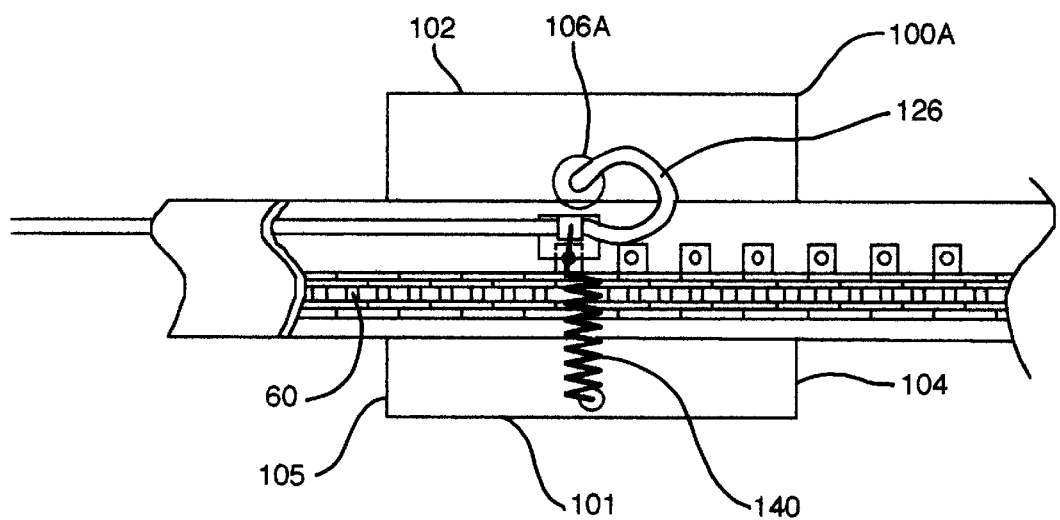
FIG. 9 is a view similar to FIG. 8 showing the underside of the tray and the C-clamp position in the middle of the crossover maneuver with the spring still in tension as the tray is transported across the top of the oven and is located in station 5 shown in FIG. 2.
Figure 10:
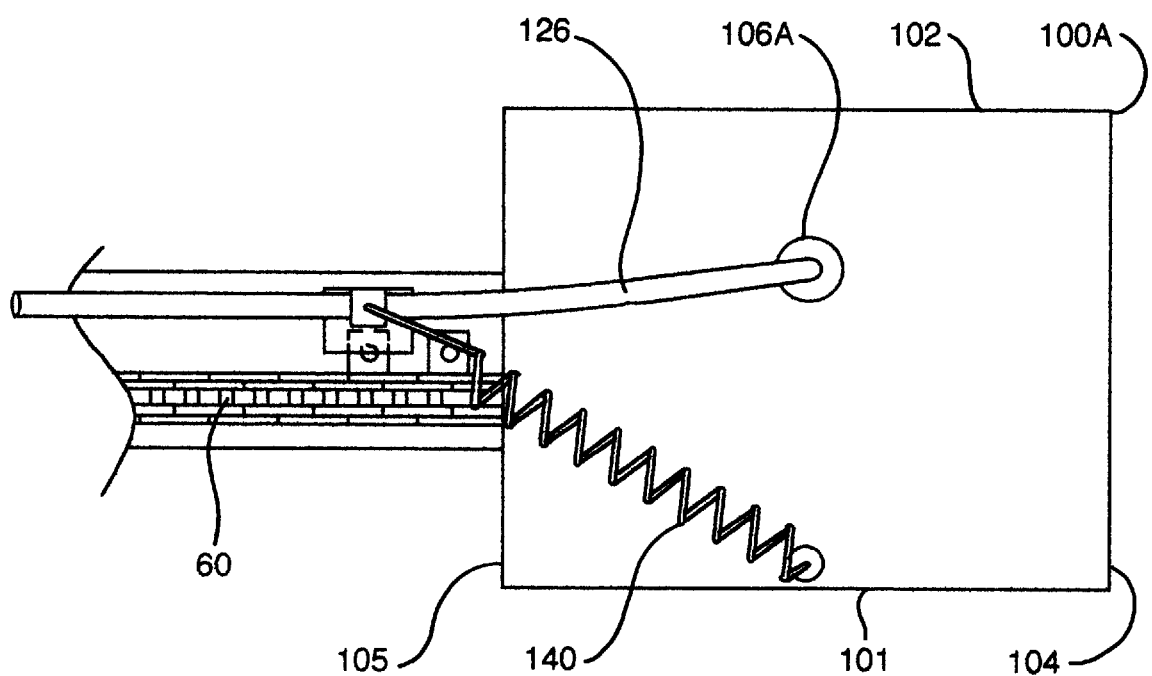
FIG. 10 is a view similar to FIG. 9 showing the tray fully moved to the right relative to the chain and with the cross-over maneuver completed and the tray is located in station 6 shown in FIG. 2 ready to begin its decent in the vertical portion 20 of the oven with the spring in full tension again and the C-clamp fully crossed over to the trailing edge of the tray.

The mechanical configuration of the present invention is the tray 100A sitting on a pair of beams 51, 52 spaced apart from each other with the chain drive 60 in the center between the beam pair 51, 52. At the cross-over point 18 a key feature is the use of a spring 140 attached on the underside of the tray 100A and also attached to the thermocouple wires which keeps tension on the hook 132 captured on tab 61 on the chain 60 so that the hook 132 stays captured in the chain drive especially during the cross-over maneuver at the top of the oven (FIGS. 8, 9, and 10). To assist in keeping tension between the spring 140 and the hook 132, the microprocessor control mechanism 11 moves the chain drive 60 slightly ahead of the conveyor drive 50 carrying the tray 100A, and this step puts tension in the spring 140. This tensioning step is performed at the top cross-over point 18 and also at the bottom disconnection point (station 10, FIG. 2). A momentary stop and reverse of the chain drive 60 movement at the disconnect point (station 10, FIG. 2) provides enough slack to easily disconnect the hook 132 as the final step.

Detailed Discussion

Figure 1:
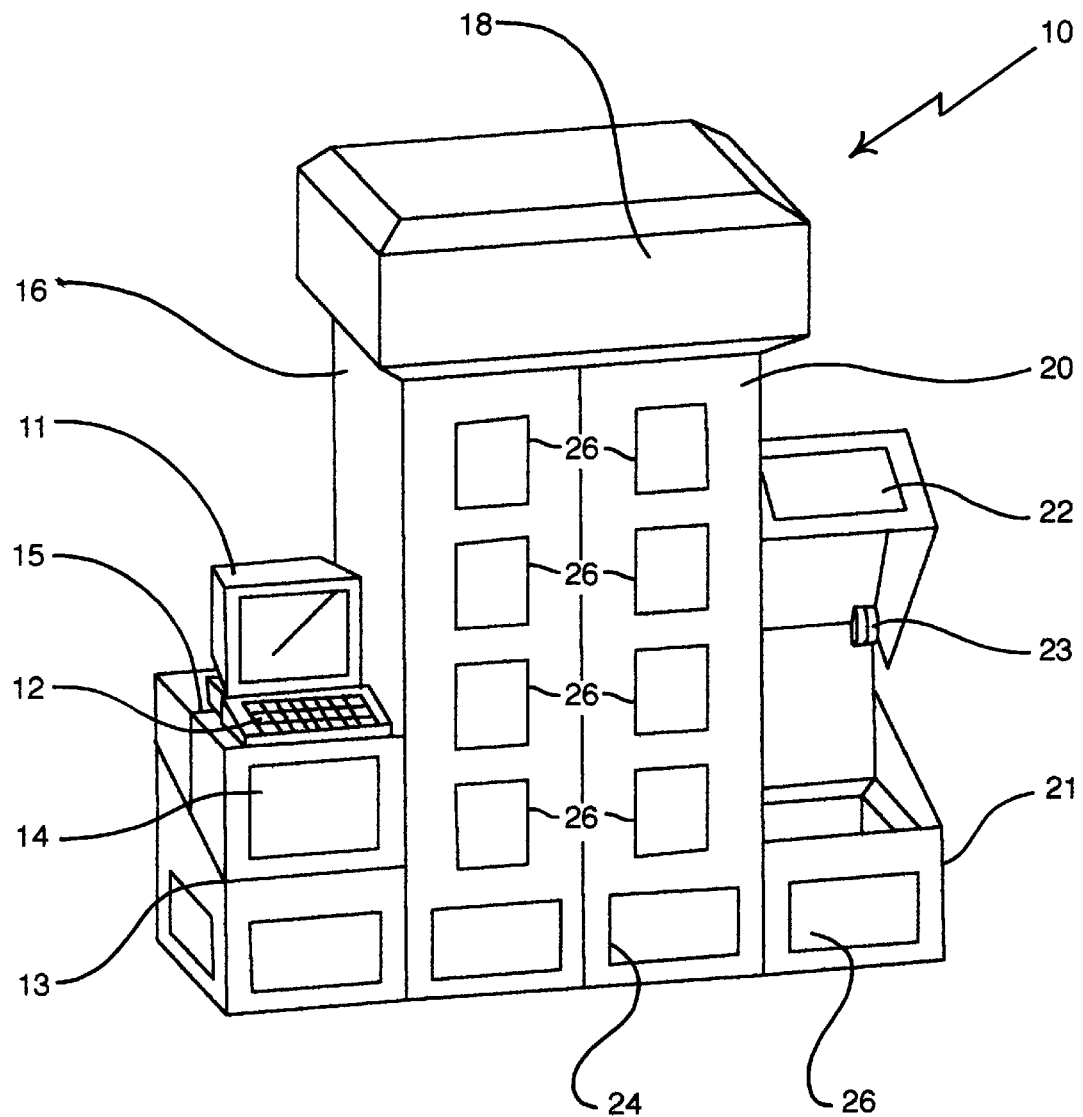
FIG. 1 is a perspective view of a vertical oven which is one embodiment of the present invention.

As best seen in FIG. 1, one embodiment of the oven is a vertical oven 10. The invention may also be used in a horizontal oven which includes having the tray and thermocouple go around corners, such as those in the vertical oven shown in FIG. 1. Oven 10 is operated by a conventional computer 11 which may be programmed by a human operator through keyboard 12 which is conveniently located adjacent the oven atop the loader entrance housing 13 which includes a plexiglass door 14 hinged at one end 15 which is easily lifted to present access to the loader conveyor 30 located inside loader housing 13.

Vertical oven 10 further includes a vertical ascent portion 16 which houses the oven upper conveyor or walking beam mechanism 17 (FIG. 3), a top crossover portion 18 which houses upper crossover lift mechanism 19 (FIG. 4), a vertical descent portion 20 which houses a walking beam mechanism 17 similar to that shown in FIG. 3 with similar guide channel 70, an unloader exit housing 21 having a plexiglass door 22 hinged at 23 which provides ready access to unloader conveyor mechanism 40 housed therein, a bottom return portion 24 which houses lower returner conveyor 25 (FIG. 2), and a plurality of safety covers and doors which provide access to the interior oven at various stages of traverse of the oven by the test thermocouple tray 100A carrying the thermocouple wires 126 of the present invention therethrough.

Figure 2:
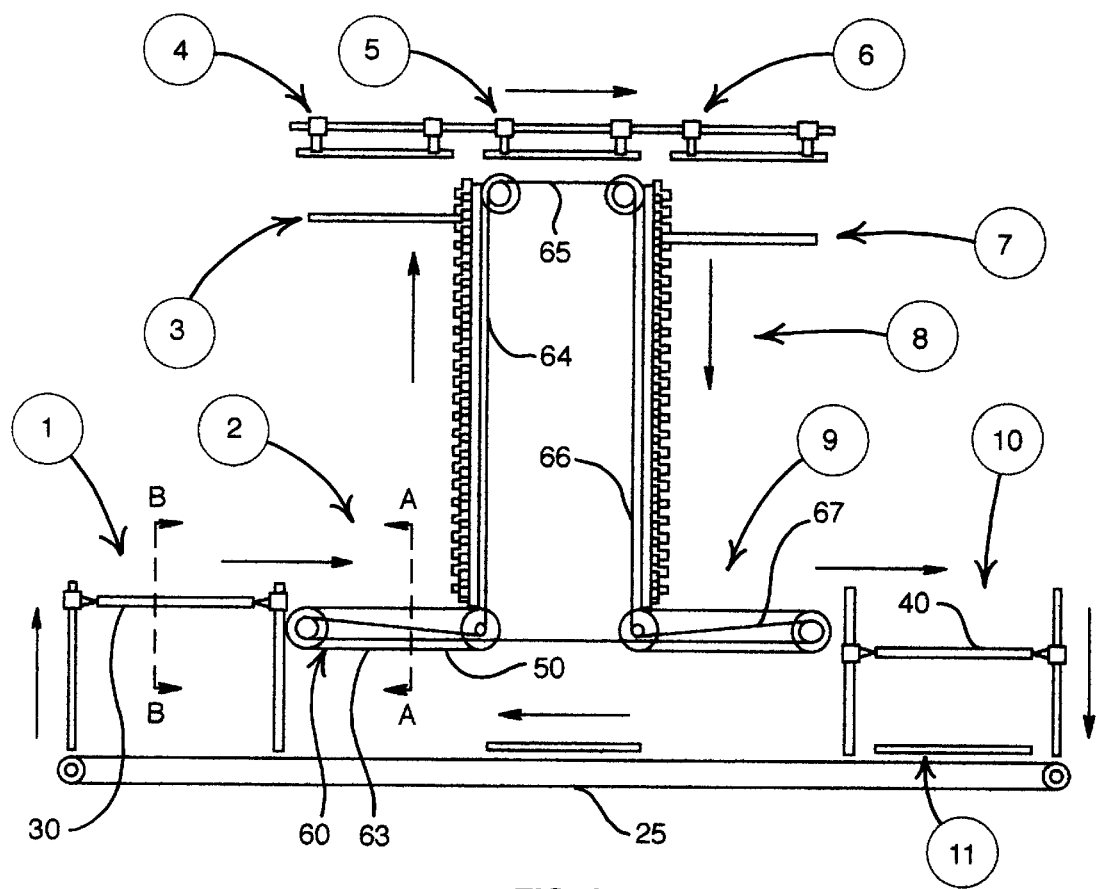
FIG. 2 is a schematic view of the inner workings and mechanisms inside the vertical oven of FIG. 1.
Figure 2A:
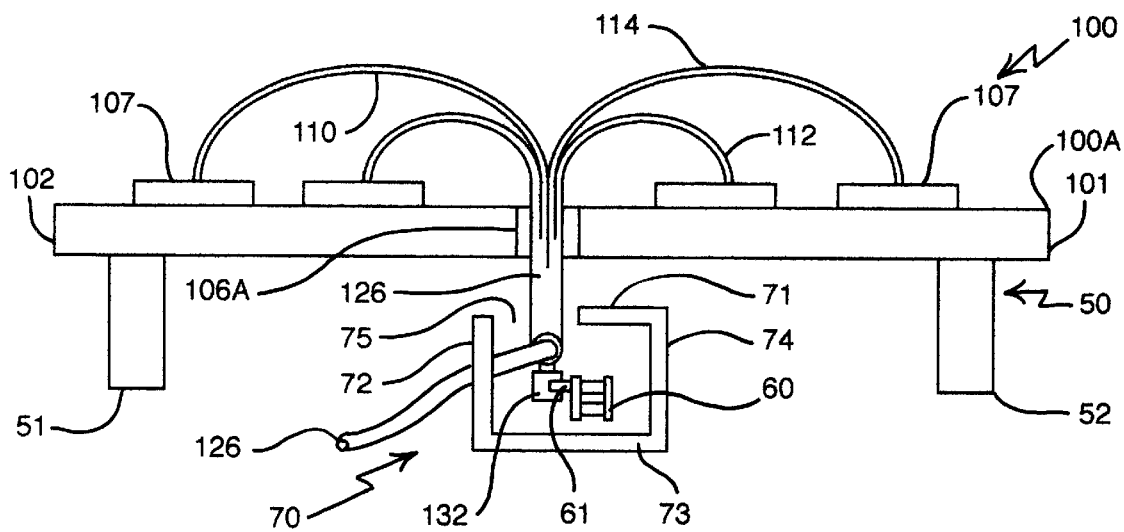
FIG. 2A is a schematic view of the tray assembly, independent conveyor drive, independent chain drive, and G-shaped guide channel of the present invention taken along the lines A—A of FIG. 2.
Figure 3:
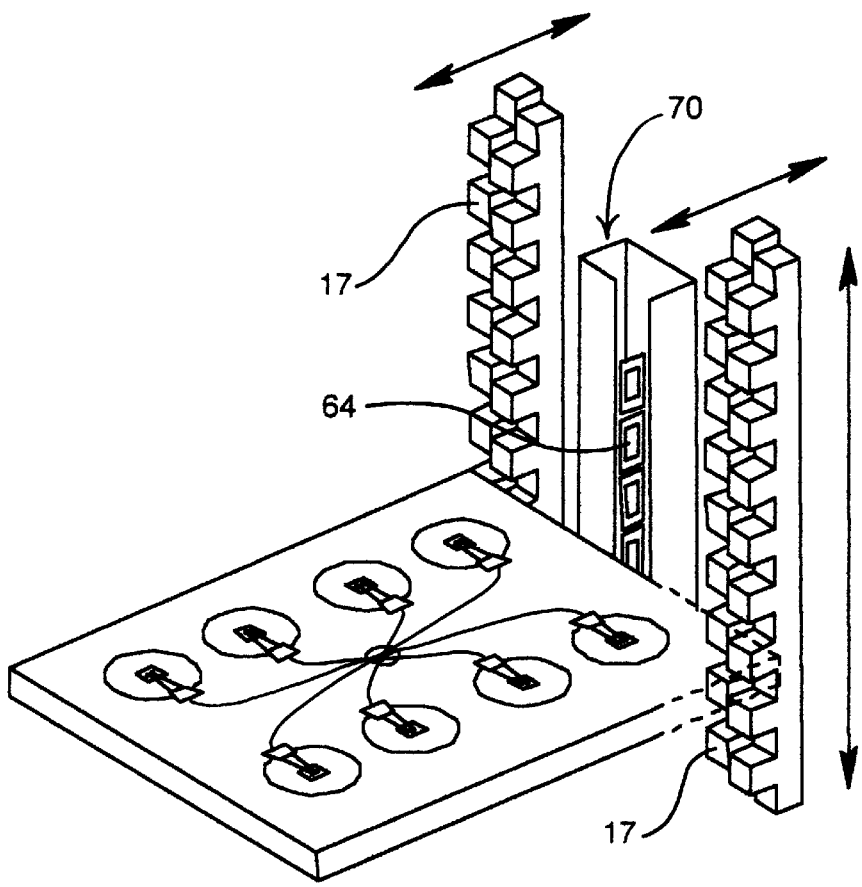
FIG. 3 is a schematic view of a conventional walking beam mechanism and a vertical portion of the G-shaped guide channel used in the vertical portions of the vertical oven of one embodiment of the present invention.

As best seen in FIGS. 2,2A an independent conveyor drive 50 comprises a pair of belts including an outboard (outboard and inboard relate to the front and back of the oven, respectively, viewed standing facing the oven) conveyor belt 51 and an inboard conveyor belt 52 which are driven in unison to transport a test tray 100A carrying the thermocouple wires of the present invention from the load position station 1 (FIG. 2) to the oven upper conveyor walking beam 17 at station 2 (FIG. 2). The conveyors are conventional. Centrally located between the conveyor belts 51,52 is independent chain drive 60 which is a conventional, endless chain drive which traverses the entire oven as shown in FIG. 2, including, a horizontal portion 61 at station 2, a vertical rising portion 64 in portion of 16 of the oven, a horizontal portion 65 across the top portion 18 of the oven, a vertically downward portion 66 through vertical portion 20 of the oven, and a horizontal portion 67 located at station 9 at the exit end of the oven. Chain drive 60 is a conventional chain link drive and has a plurality of tabs 61 one of which identifies a "Home Position" 62 at which the drive program for transporting the thermocouple through the thermocouple of the present invention through the vertical oven 10 is started (FIG. 5).

As best seen in FIGS. 2A, 5B the guide channel 70 is G-shaped and encircles endless chain drive 60 through its entire traverse in the vertical oven including the horizontal portion at station 2 the vertical portion leading to station 3 the crossover portion at the top of the oven the vertical downward portion leading to station 9 and the horizontal portion at station 9. G-shaped channel 70 has an upper horizontal portion 71, an outboard vertical portion 72 a lower horizontal portion 73, an inboard vertical portion 74, an open slot 75 in its upper side, and an entrance edge 76 at the inlet end against which the thermocouple wire of the present invention slidingly bears as it is drawn through the vertical oven 10 by the chain 60 and unwinding from reel 80, the other ends of the thermocouple wire being attached to the readout device 90 which is any conventional readout. As more fully described below, the thermocouple bundle 126 remains captured within guide channel 70 throughout its traverse through the vertical oven of the present invention.

Figure 6:
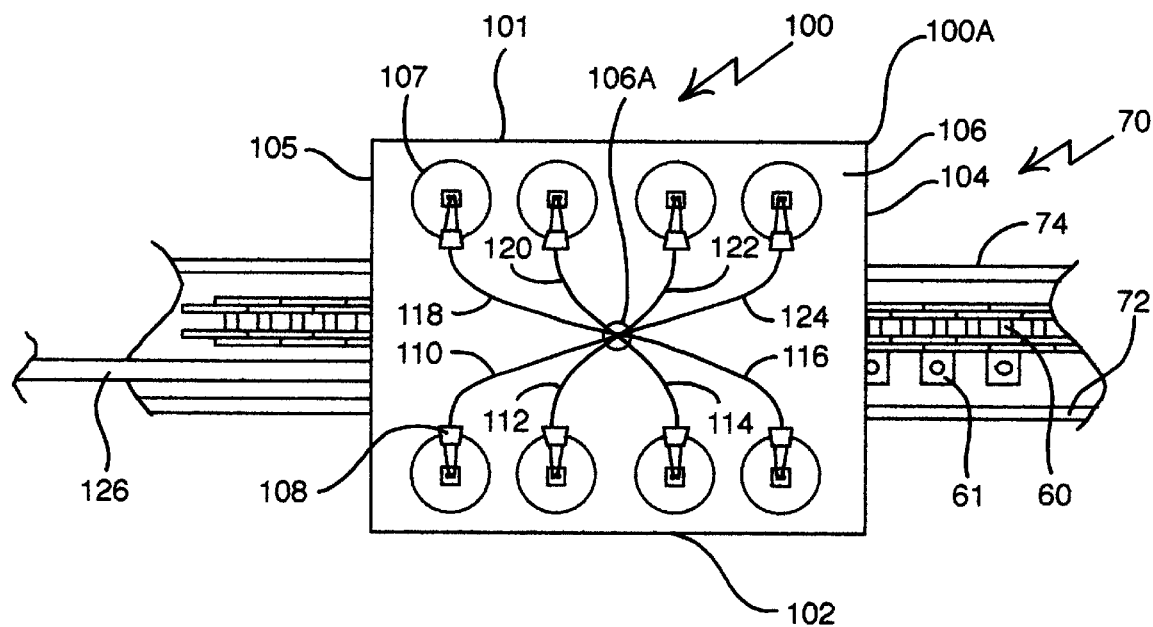
FIG. 6 is a plan view of FIG. 5B looking down and from the right side of FIG. 5B showing the top surface of the tray with the ends of the thermocouple wires attached to substrates thereon. The tray is in station 2, FIG. 2.

As best seen in FIG. 6 which is taken looking down onto the top surface of the test tray of the present invention, the tray assembly 100 includes a tray 100A (FIGS. 2A,5B) having an inboard edges 101, an outboard edge 102, a leading edge 104, a trailing edge 105, a top surface 106 having a hole 106A through which wire bundle 126 passes, and carrying a plurality of substrates 107 to each of which is attached 108 (FIG. 6) one pair of thermocouple wires 110, 112, 114, 116, 118, 120, 122, and 124 which together form a wire bundle 126. The wire bundle 126 is secured within wire bundle clamp 128 (FIGS. 5A, 5B) to prevent any slippage therebetween, and wire bundle clamp 128 is secured, such as by screw 130 (FIGS. 5A, 5B), to a C-shaped clamp 132 having one leading depending L-shaped portion 134 and one trailing depending L-shaped portion 136 designed to slip over a tab 61 of chain 60 to be carried securely therewith pulling in trail the extended length of the bundle 126 of thermocouple wires attached to reel 80 through the vertical oven of the present invention. Tray assembly 100 further includes a spring 140 one end 141 of which is secured to C-clamp 132 (FIG. 8) and the other end 142 of which is secured to the tray 100A, such as in hole 143. Spring 140 resiliently holds C-clamp 132 on tab 61 through the traverse of the test tray 100A through the vertical oven of the present invention, and particularly, retaining that tension during the crossover maneuver at the top of the oven portion 118 as described in greater detail below with respect to FIGS. 8, 9, and 10.

As best seen in FIGS. 2A, 5B, and 8 it is important to observe the manner in which the thermocouple wires are positioned relative to the tray 100A, the conveyor belts 51, 52, the guide channel 70, and the independent chain drive 60 in order to assure that when the wires are pulled through the oven and the crossover is performed at the top, they do not become entangled.

As best seen in FIG. 3, the present invention employs a conventional walking beam mechanism 17 which is embodied in vertical portion 16 and also in vertical portion 20 of the vertical oven 10 for raising tray 100A from stations 2–3 of FIG. 2, and for lowering the tray from stations 7–9 of FIG. 2. The walking beam mechanism 17 which comprises the upper oven conveyor of the present invention is conventional and is readily understood by one skilled in the art.

Figure 4:
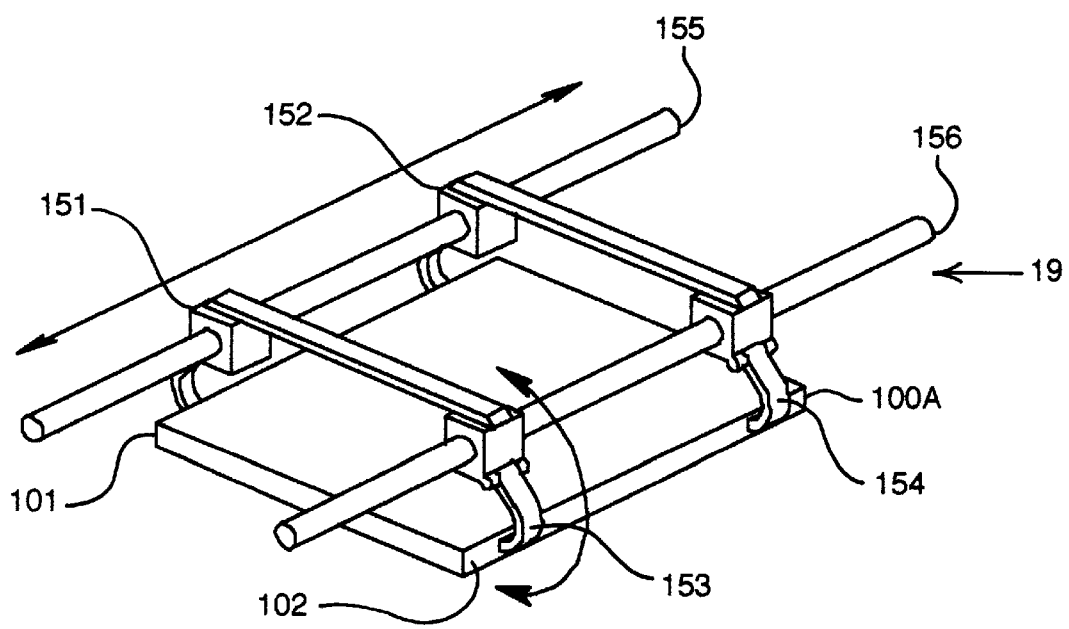
FIG. 4 is a crossover lift mechanism for transporting the test tray of the present invention across the top crossover portion of the vertical oven embodiment of the present invention.

As best seen in FIG. 4, a conventional upper crossover lift mechanism 19 is used to transport the test tray of the present invention from its upper location at station 3 in the trailing edge of the oven portion 16 across the top portion 18 through stations 4, 5, and 6 to its station 7 in the leading, downer vertical portion 20 of the oven. Upper crossover mechanism 19 includes two pairs of grippers 151, 152, 153, and 154 which are selectively engagable to grab the inboard and outboard edges, respectively of tray 100A from station 3, lift it slightly approximately 5 mm on command from the microprocessor driven computer 11, and transport it laterally on a pair of horizontal rails 155, 156 in a crossover maneuver of upper portion 18 of the vertical oven 10. Upper crossover mechanism 19 may be operated by any conventional means as would be well known to a person of ordinary skill in the art, including a hydraulic drive, electric drive, or the like.

Finally, vertical oven 10 includes a lower return conveyor 25 as best seen in FIG. 2 which includes having an empty tray or plate at station 11 and transporting it back to the front of the oven station 1 for reuse in the next cycle.

Operation of the System

The invention is best understood by a detailed description of the steps utilized in implementing the travelling thermocouple of the present invention in the apparatus described above.

As best seen in FIGS. 2A, 5B, and 8, when the tray 100A is inserted onto the loader conveyor 30 atop inboard and outboard conveyor belts 51, 52, to be driven to the right as seen in FIG. 2 into the vertical ascent portion 16 of the oven 10 by engaging C-clamp 132 on tab 61 of the chain 60 starting at the "Home Position" so that the wire bundle will be drawn into the interior of G-shaped guide channel 70 against channel entrance edge 76. The thermocouple wires 110–124 attach at one end to substrate 107 atop tray 100A, pass down through hole 106A of tray 100A, and then pass into the interior of guide channel 70 where the bundle is firmly attached by C-clamp 132 to the "Home Position" tab 61 of the chain 60 so that there is no further relative motion between the wire bundle 126 and the drive chain 60. Once this attachment between the C-clamp 132 and tab 61 of the chain 60 is made, as the chain drive moves forwardly through the oven it pulls in trail the wire bundle 126 which unwinds from reel 80 as the travelling thermocouple traverses the oven. Throughout its traverse through the oven wire bundle 126 remains captured in the interior of guide channel 70. During the crossover maneuver at the top portion 18 of oven 10 relative motion is effected between the chain drive 60 and the tray 100A. This relative motion is preferably effected by stopping independent chain drive 60 temporarily while using upper crossover lift 19 to engage tray 100A, lift it slightly and move it rightwardly, as seen in FIG. 2, thereby enabling the C-clamp 132 to move leftwardly relative to the tray 100A's movement causing the C-clamp 132 to move from a leading edge position (FIG. 8) to a central position under the tray (FIG. 9), and then to a completely crossed over trailing position relative to the tray (FIG. 10) without entangling the wires and while the C-clamp is continuously held in tension engaged on tab 61 of chain 65 the resilient member 140.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A process of continuously sensing temperature of a media component traversing an oven comprising the steps of:

(a) supporting the media component on a tray on a moving conveyor and transporting the tray in a path through the oven, (b) attaching a thermocouple, formed of two metal wires of extended length, at one end to the media component and coupling the thermocouple at the other end to a readout device and continuously sensing the temperature of the media component during the media component's traverse of the oven while pulling a length of the wire through the oven in trail, (c) attaching the wires of the thermocouple to a chain moving independently of the moving conveyor but in synchronism therewith in a traverse of the oven, and (d) temporarily moving the tray relative to the chain to cross the point of attachment of the wires to the chain from a leading end of the tray to a trailing end of the tray, whereby the tray moves around a corner in the path without entangling the extended length of wires.

2. The process of claim 1 further comprising the step of:
retaining the length of wire in a guide channel throughout its traverse of the oven.

3. The process of claim 1 wherein the step of attaching the wires to the chain further comprises the step of:
engaging a wire holder portion upon a chain extension portion.

4. The process of claim 1 further comprising the step of:
resiliently retaining the holder engaged with the chain throughout its traverse of the oven.

5. The process of claim 4 wherein the temporarily moving step further comprises the step of:
the resilient retaining step including a spring attached at one end to the holder and the other end to the tray, the wires having a slack portion extending between the holder and the media component and passing through the tray to the media component, and moving the slack portion of the wires and the one end of the spring under the tray from a leading end of the tray to a trailing end of the tray.

6. The process of claim 3 wherein the temporarily moving step further comprises the step of:

moving the tray forwardly in the oven relative to the chain or moving the chain rearwardly in the oven relative to the tray.

7. The process of claim 6 wherein the step of moving the chain rearwardly relative to the attachment further comprises the step of:

stopping the chain while continuing to forwardly move the conveyor carrying the tray.

8. The process of claim 1 further comprising the steps of:
measuring the sensed temperatures, and
displaying the measured temperatures.

9. The process of claim 1 further comprising the steps of:
disengaging the wires from attachment to the chain,
uncoupling the other end of the wires from the readout device, and
pulling the length of wire forwardly through the oven.

10. The process of claim 9 wherein the disengaging step further comprises the step of:
moving the chain forwardly relative to the tray.

11. The process of claim 10 wherein the step of moving the chain forwardly relative to the tray further comprises the steps of:

stopping the conveyor supporting the tray while continuing to move the chain forwardly a predetermined distance to slacken the attachment of the wires to the chain and, then, stopping the chain to permit the wire attachment to be easily detached from the chain.

12. The process of claim 1 further comprising the step of:
moving the tray around a corner in a vertical oven.

13. The process of claim 1 further comprising the step of:
moving the tray around a corner in a horizontal oven.

14. The process of sensing the temperature of a product being moved through an oven on a conveyor drive with a thermocouple formed of two metal wires of extended length attached to the product comprising the steps of:

engaging the wires of the thermocouple with a chain of a chain drive to pull the thermocouple wires in a path completely through the oven, and while generally keeping the chain in pace with the product and while resiliently retaining the engagement of the thermocouple wires to the chain, temporarily moving the conveyor drive relative to the chain drive to enable the product and thermocouple to traverse a corner in the path through the oven without entangling the wires.

15. In an apparatus for heat treating a substrate having a main heating chamber with an entrance and exit, and a conveyor drive for transporting a plurality of media components supported on trays on the conveyor drive along a path through the main heating chamber, wherein the improvement comprises:

a chain drive independent of the conveyor drive for keeping pace with the conveyor drive, a computer controller for synchronizing the heating and drives, a thermocouple, formed of two metal wires of extended length, attached at one end to a media component supported on one of the conveyor drives and at the other end to a readout device for continuously sensing the temperature of the media component during the media component's traverse of the main heating chamber while pulling a length of the wires through the oven in trail, an attachment device secured to the wires of the thermocouple resiliently engaged with the chain drive for pulling the length of the wires through the main heating chamber in synchronism with the media component during the media component's traverse of the main heating chamber, and the computer control enabling a first temporary relative motion between the conveyor drive and chain drive to cross the attachment device from a leading end of the tray to a trailing end of the tray, whereby as the tray moves through the main heating chamber it is enabled to move around a corner in the path without entangling the extended length of wires.

16. The apparatus of claim 15 further comprising:

a channel extending along the entire path for maintaining the extended length of the wires therein while guiding the extended length of the wires as they are being pulled through the main heating chamber without entanglement.

17. The apparatus of claim 15 further comprising:

the channel being a G-shaped guide with the open slot on its upper side, the leading end of the wires exiting the slot and passing through a hole in the support to attach to the substrate.

18. The apparatus of claim 15 further comprising:

a spring resiliently holding the attachment device in engagement with the chain of the chain drive as the attachment device is moved relative to the tray from a position near the leading edge of the tray to a position near the trailing edge of the tray.

19. The apparatus of claim 15 further comprising:

a display coupled to the other end of the thermocouple for reading out the temperatures sensed by the thermocouple.

20. The apparatus of claim 15 further comprising:

the attachment device being made easily disengageable from the chain of the chain drive by a second temporary relative motion between the chain drive and the conveyor drive in a direction opposite the first temporary relative motion.

21. The apparatus of claim 15 further comprising:

the main heating chamber comprising a vertical oven having at least one corner in the path therethrough.

22. The apparatus of claim 15 further comprising:

the main heating chamber comprising a horizontal oven having at least one corner in the path therethrough.

* * * * *